United States Patent [19]

Nishimura et al.

[11] Patent Number: 4,929,512
[45] Date of Patent: May 29, 1990

[54] METAL AND COMPOSITE MATERIAL MADE OF THE METAL AND RUBBER

[75] Inventors: Yoshifumi Nishimura; Susumu Yamamoto; Hidekazu Nakata, all of Itami; Kiyoshige Muraoka, Kobe; Mamoru Uchida, Akashi; Takafumi Taguchi, Nishinomiya, all of Japan

[73] Assignees: Sumitomo Electric Industries, Ltd., Osaka; Sumitomo Rubber Industries, Ltd., Hyogo, both of Japan

[21] Appl. No.: 362,416

[22] PCT Filed: Oct. 25, 1988

[86] PCT No.: PCT/JP88/01081
§ 371 Date: Apr. 14, 1989
§ 102(e) Date: Apr. 14, 1989

[87] PCT Pub. No.: WO89/03901
PCT Pub. Date: May 5, 1989

[30] Foreign Application Priority Data

Oct. 26, 1987 [JP] Japan .................. 62-271455
Mar. 3, 1988 [JP] Japan .................. 63-50931
Apr. 22, 1988 [JP] Japan .................. 63-101012

[51] Int. Cl.$^5$ ............................................. B32B 15/06
[52] U.S. Cl. ........................... 428/610; 428/625; 428/677; 428/941
[58] Field of Search ............. 428/625, 610, 674, 675, 428/676, 677, 941; 152/451; 57/902

[56] References Cited

U.S. PATENT DOCUMENTS

| | | | |
|---|---|---|---|
| 2,154,834 | 4/1939 | De Lamather | 428/625 |
| 2,939,207 | 6/1960 | Adler | 428/625 |
| 3,961,740 | 6/1976 | Nakamoto et al. | 428/625 |
| 4,218,517 | 8/1980 | Van Ooij | 152/451 |
| 4,226,918 | 10/1980 | Friend | 428/625 |
| 4,255,496 | 3/1981 | Huemers | 428/677 |
| 4,446,198 | 5/1984 | Shemenski et al. | 428/625 |
| 4,572,263 | 2/1986 | Ogano et al. | 428/625 |
| 4,605,590 | 8/1986 | Delseth et al. | 428/625 |
| 4,645,718 | 2/1987 | Dambre | 428/625 |
| 4,704,337 | 11/1987 | Coppens et al. | 428/677 |

FOREIGN PATENT DOCUMENTS

| | | | |
|---|---|---|---|
| 209280 | 5/1956 | Australia | 428/625 |
| 595160 | 3/1960 | Canada | 428/625 |
| WO80/328 | 3/1980 | PCT Int'l Appl. | 428/677 |
| 2039580A | 8/1980 | United Kingdom | 152/451 |

Primary Examiner—John J. Zimmerman
Attorney, Agent, or Firm—Wenderoth, Lind & Ponack

[57] ABSTRACT

A composite material made of metal and rubber for use in automotive tires, hoses, conveyor belts and the like. Its object is to increase its durability by improving the adhesion properties between the metal and the rubber. To accomplish this object, a metal provided with an improved plating layer is used in combination with a rubber having such a composition as to be suitable for use with the metal. More specifically, the composite material of metal and rubber contains as basic ingredients a metal plated with a copper-zinc-nickel ternary alloy and natural rubber or synthetic isoplene rubber containing sulfer and adhesion promotors such as cobalt salt of organic acid or silica, resorcin and hexamethylenetetramine. The rubber is vulcanized to be bonded to the metal.

3 Claims, 1 Drawing Sheet

METAL AND COMPOSITE MATERIAL MADE OF THE METAL AND RUBBER

FIELD OF TECHNOLOGY

The present invention relates to a metal and a composite material made of the metal and rubber for tires, hoses, conveyor belts, or the like and more specifically a metal and a composite material which exhibit a high adhesion between metal and rubber.

TECHNOLOGICAL BACKGROUND

It is a well-known practice to embed various kinds of reinforcing materials in rubber to improve its strength and durability. A composite material made of rubber and metal is particularly applied to automotive tires, high-pressure rubber hoses, conveyor belts or the like and is expected to meet many quality requirements. Among them, it is a very important requirement to increase the adhesion between the rubber and the metal in a composite material to improve its durability.

This requirement is particularly strong with a steel radial tire in which are used steel cords plated with copper-zinc (brass) binary alloy as a reinforcing metal. With the expansion of highway, such a tire is expected to reveal high durability and high stability while running at high speed. For this purpose, it is very important to improve the adhesion between steel cord and rubber. In particular, a large-sized steel radial tire for trucks and buses is strongly required to maintain good adhesion for a prolonged period of time, since such a tire is used after repairing its tread portion once or even twice.

When the rubber in a composite material is vulcanized, the copper in the plating on the steel cords reacts with the sulfur in the rubber to form a sulfide at the interface between the steel cords and the rubber, thus adhering them together. Various trials have been made to improve the plating on the metal and the rubber in the composite material to increase the adhesion between the metal and the rubber. As a result, the adhesion after vulcanization, that is, the initial adhesion is being improved. But the initial adhesion tends to decrease gradually as the material is exposed to severe conditions during the service life. Thus, the adhesion durability has not yet reached a sufficient level. Therefore, the prior art composite materials have still much to be improved.

If the adhesion between the rubber and the steel cords is insufficient, the adhesion might be broken owing to heat accumulation due to hysteresis loss of rubber while the tire is rotating, causing what is called the separation between the steel cords and the rubber, thus prohibiting the tire from rotating any more.

Further, if the tire gets damaged in its tread or side wall and the damage is so deep as to reach the steel cords, moisture might infiltrate into the tire through the damaged portion, vaporize by heat generated while the tire is rotating, and invade into between the filaments of the steel cords to break the adhesion between the steel cords and the rubber, inducing the aforementioned separation. If the air in the tire contains moisture, it might infiltrate the inner liner to attack the steel cords, thus causing separation in the same manner as described above.

Various methods have been proposed to increase the adhesion between the rubber and the steel cords in a radial tire in order to avoid such a phenomenon.

One of such methods is to modify the composition of the rubber covering the steel cords. It was found out in 1950's that the adhesion between the rubber and the steel cords can be improved by adding a cobalt salt of an organic acid into the rubber. The optimum type and quantity of the cobalt salt have been investigated in various trials since then. Japanese Unexamined Patent Publication No. 60-42440 teaches to optimize the quantities of sulfur and cobalt salt of an organic salt in order to improve the adhesion. Another approach has been to use an HRH series composition containing silica, resorcin and hexamethylenetetramine.

However, if the rubber material contains an excessive amount of cobalt salt of organic acid, the quality of unvulcanized rubber might deteriorate and the adhesion might degrade as a result of long or high-temperature vulcanization or heat aging after long operation. Especially with an HRH series rubber composition, there might arise such problems as environmental contamination or rubber scorching in the production.

Another method is to improve the plating on the steel cords. For example, Japanese Patent Applications Nos. 54-127847, 54-173889 and U.S. Pat. No. 4,226,918 propose to use a ternary alloy plating comprising brass and nickel. However, the ternary alloy plating on the steel cords tends to get damaged during wire drawing because of its poor workability. Also, the addition of nickel decreases the initial adhesion between the rubber and the steel cords. Thus, this method has not yet been put into practical use. On the other hand, if the content of additives in the rubber such as cobalt salt of organic acid, silica, resorcin and hexamethylenetetramine is reduced to a small amount or zero in order to improve the quality characteristics of the rubber or to avoid the production problems, the decrease in the initial adhesion due to the addition of nickel to the plating will be marked.

The problem with the drawing of the steel cords might be solved by improving the drawing conditions such as the shape of a dice and the lubricant used. But no countermeasure has been taken to the problem of decrease in the initial adhesion due to the addition of nickel to the plating. The problem has to be attacked from the viewpoint of the compositions of both the plating and the rubber.

It is an object of the present invention to provide a composite material comprising metal and rubber which is improved in the adhesion after wet heat aging and adhesion after heat aging (hereinafter referred to as "wet heat resistance" and "heat resistance", respectively) without impairing the initial adhesion or the quality characteristics of the rubber or causing any production problems.

DISCLOSURE OF INVENTION

Means provided by the present invention to solve the problems are the following three:

(1) A metal plated with a copper/zinc/nickel ternary alloy plating comprising 60 to 75 per cent by weight of copper, 4 to 14 per cent by weight of nickel and the remainder of zinc, and the content of nickel being not more than 4 per cent by weight at the outer surface of the plating, increasing gradually with depth from the outer surface to the depth of 50 angstroms, and being about 4 to 14 per cent by weight in the deeper area.

(2) A composite material produced by vulcanizing to adhere to the metal as claimed in claim 1 a rubber comprising 100 parts by weight of natural rubber or synthetic isoprene rubber, 1 to 8 parts by weight of sulfur, and either not more than 6 parts by weight of a cobalt salt of an organic acid or not more than 20 parts by weight of silica, not more than 5 parts by weight of resorcin and not more than 5 parts by weight of hexamethylenetetramine as an adhesion accelerator.

(3) A composite material produced by vulcanizing to adhere to the metal as claimed in claim 1 a rubber comprising 100 parts by weight of natural rubber or synthetic isoprene rubber, 3 to 6 parts by weight of sulfur, not more than 0.5 part by weight of a cobalt salt of an organic acid as an adhesion accelerator, and 0.5 to 2 parts by weight of N-tert-buthyl-2-benzothiazolil sulfenamide or N-oxydiethylene2-benzothiazolil sulfenamide as a vulcanization accelerator.

A: present invention (specimen 3)
B: comparative example (specimen 4)
C: present invention (specimen 10)
D: comparative example (specimen 11)

BEST MODE FOR EMBODYING THE INVENTION

The copper/zinc/nickel ternary alloy plating formed on a metallic material improves the surface layer of the plating to prevent the initial adhesion from dropping due to the addition of nickel and to improve the heat resistance and the wet heat resistance. The entire plating is composed of 60-75 per cent by weight of copper, 4-14 per cent by weight of nickel and the remainder being zinc. The plating and heat-diffusing conditions are optimized and the plated metal is subjected to wire drawing so that the nickel content will be minimum at the outer surface of the plating and increase gradually with depth. Specifically, the nickel content is controlled so that it will be not more than 4 per cent by weight at the outermost surface of the plating, increase gradually with depth up to the depth of 50 A, and be kept within the range of about 4-14 per cent by weight in the deeper area.

Figure 1:
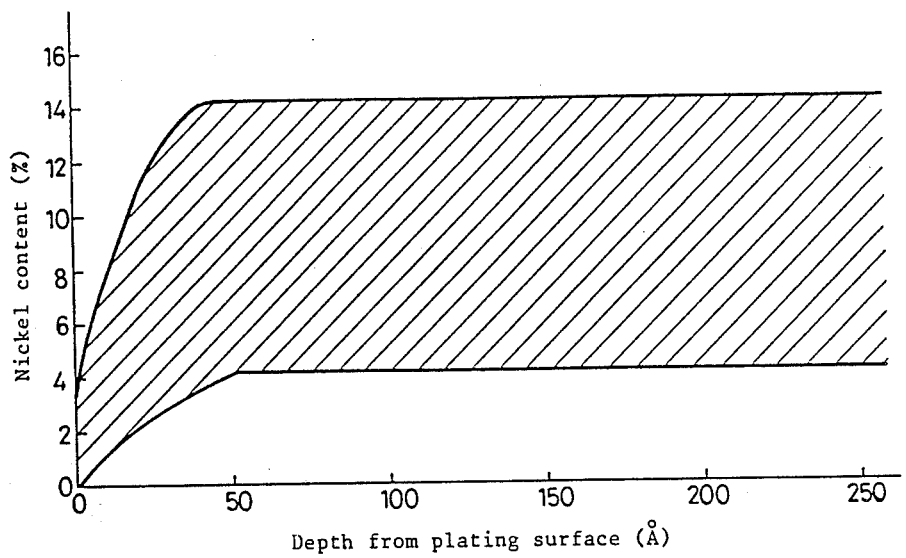
FIG. 1 is a graph showing the range of nickel content in the copper/zinc/nickel ternary alloy plating according to the present invention.

According to the present invention, the nickel content at the surface layer of the plating is limited within the range as shown by the shadowed area in FIG. 1. This is the result of analysis by the Electron Spectroscopy for Chemical Analysis (ESCA) in which the plating is sputtered with argon ions to analyze the content distribution of copper, zinc and nickel in the plating in the direction of its depth. The feature of the present invention consists in that as shown in FIG. 1, the nickel content in the outer surface area of the plating gradually increases with depth. In the area deeper than 50 A from the plating surface, the nickel content is set at about 4-14 per cent by weight and may be distributed uniformly or may increase or decrease with depth. The nickel content as used herein is indicated in weight per cent, converted from the atomic per cent which is calculated from the analysis intensity of copper, zinc and nickel.

There was a problem that the addition of nickel to the conventional brass plating decreases the adhesion reaction with rubber and thus the initial adhesion. On the other hand, it has an advantage of increasing the wet heat resistance and the heat resistance. It follows from this fact that in order to improve the initial adhesion as well as the wet heat resistance and the heat resistance, one solution is to form the surface layer of the plating, which has an influence on the initial adhesion reaction, of nickel-free brass and form the inner layer of ternary alloy comprising copper, zinc and nickel. But it is difficult to produce a metallic material having two different kinds of plating layers.

The copper/zinc/nickel ternary alloy plating produced by the method described below has a good initial adhesion because the nickel content at the surface layer having an effect on the initial adhesion reaction between metal and rubber is small due to the fact that the nickel content in the plating surface layer has such a gradient as defined in the present invention and that the rubber according to the present invention is combined with the plating. Although the wet heat resistance and the heat resistance are affected by the corrosion reaction in the plating layer and the progress of adhesion reaction, since the plating layer contains a fairy large amount of nickel, the corrosion reaction and the adhesion reaction can be effectively suppressed, thereby improving the wet heat resistance and the heat resistance.

One feature of the present invention consists in that the surface layer of the copper/zinc/nickel ternary alloy plating is improved to increase the initial adhesion as well as the wet heat resistance and the heat resistance. The prior art ternary alloy plating technique fails to disclose the concept of increasing the initial adhesion by improving the composition of the surface layer of the plating.

It will be described below why the composition of the plating is defined. The nickel content in the surface area of the plating is limited to not more than 4 per cent by weight because if over 4 per cent the initial adhesion will be low. Further, the range where the nickel content gradually increases with depth from the plating surface is limited to the depth of 50 Å. If less than 50 Å, the initial adhesion would be unfavorably affected.

The copper content in the plating is limited within the range of 60-75 per cent by weight. If it is less that 60 per cent by weight, the adhesion reaction between the copper in the plating and the sulfur in the rubber will be too scarce to obtain a high initial adhesion. If over 75 per cent by weight, the reaction would progress excessively especially during use of the tire, thereby considerably lowering the wet heat resistance and the heat resistance.

The nickel content is limited within the range of 4-14 per cent by weight. If less than 4 per cent by weight, the nickel would be insufficient to increase the heat resistance and the wet heat resistance, though the initial adhesion is good. If more than 14 per cent by weight, the nickel content in the surface area could not be suppressed to less than 4 per cent by weight. This will unduely affect the initial adhesion.

Next, it will be described how the metal covered by the copper/zinc/nickel ternary alloy plating according to the present invention is produced. There are two ways for forming the plating layer. One is to put a plating of one layer upon another in any of the orders listed below, followed by heat diffusion.

copper plating→nickel plating→zinc plating copper plating→zinc plating→nickel plating zinc plating→nickel plating→copper plating copper plating→zinc/nickel binary alloy plating The other way is to perform a copper/zinc/nickel ternary alloy plating in which three elements are deposited simultaneously, without heat diffusing.

In the latter method, the control of the plating bath is very difficult in order to stably obtain a desired composition of the plating. Such a method is thus not practical. Also, since the composition of the plating obtained in this method is uniform from its surface to deep inside, if the nickel content is over 4 per cent by weight, the initial adhesion will be poor.

In the former method in which plating and heat diffusion are combined, it is important that each element be readily diffused to adjacent layers to form a ternary alloy plating. But heat diffusion is more difficult to occur between copper and nickel than between copper and zinc or between nickel and zinc. Thus if the copper layer and the nickel layer are adjacent to each other, the heat diffusion at high temperature or for a long time will be required. Such a method is therefore not practical, either. Further, if a zinc plating is directly formed on a steel wire, a hard and brittle iron-zinc alloy phase tends to form at the interface between the steel wire and the zinc layer during heat diffusion. This phase might cause the plating to peel off the steel wire during the wire drawing after plating and heat diffusion.

Thus, in order to form a copper/zinc/nickel ternary alloy plating layer, any of the following steps, followed by heat diffusion; should be taken:

copper plating→zinc plating→nickel plating nickel plating→zinc plating→copper plating copper/nickel binary alloy plating→zinc plating copper plating→zinc/nickel binary alloy plating zinc/nickel binary alloy plating→copper plating nickel plating→copper/zinc binary alloy plating copper/zinc binary alloy plating→nickel plating Among them, the methods using copper/nickel or copper/zinc binary alloy plating are not preferable because not only is it difficult to suitably control the plating bath, but also a cyanide bath has to be used which can cause a public pollution problem. Thus, the first, second, fourth and fifth methods ar preferable.

Next, we shall discuss the method of forming a ternary alloy plating having such a nickel content gradient at the surface layer as to increase gradually with depth from the surface of the plating. With the second and fifth methods, the plating according to the present invention can be obtained by suitably setting the heat-diffusing temperature and time. With the first and fourth methods, the ternary alloy layer is formed by heat diffusion and simultaneously, the zinc and nickel in the outer surface layer tend to be oxidized, thus forming an oxide layer. But, because of its poor workability, most part of the oxidized layer will peel off by subjecting the metallic material to wire drawing after heat diffusion. The nickel content at the surface layer of plating after wire drawing can be adjusted so as to decrease from the inside of plating toward surface and have a content gradient by controlling the heat diffusion conditions to form an oxidized layer at the surface and by controlling the wire drawing conditions to peel the oxidized layer. Thus, the plating layer according to the present invention is obtained by optimizing the heat diffusion conditions and the wire drawing conditions. These conditions depend on the plating method and the thickness and composition of the plating.

According to the present invention, the metallic material plated with the copper/zinc/nickel ternary alloy should have a diameter of 0.1–1.0 mm after wire drawing with the plating layer having a thickness of 0.05–0.50 micron. The drawn wire may be used as it is or may be shaped into a cord, wire gauze or fabric. When stranding a plurality of such drawn wires into a double-layer cord having a core layer and an outer layer or into a triple-layer cord having a core layer, an intermediate layer and an outer layer in such a manner that some of the wires are in contact with the surrounding rubber while the others are not, only those in contact with the rubber may be plated with copper/zinc/nickel ternary alloy layer according to the present invention while plating the others with copper, zinc or copper/zinc binary alloy.

Next, the composition of rubber used in the present invention will be described. The adhesion between rubber and metal is influenced not only by the composition of the plating on the metal but also by that of the rubber. Therefore, the composition of rubber is important for good adhesion therebetween.

Natural rubber or synthetic isoprene rubber is used as the basic component of rubber and sulfur is added to vulcanize the rubber and also improve the adhesion with the plating layer covered on the metal surface. The content of sulfur should be 1–8 parts by weight in relation to 100 parts by weight of natural rubber or synthetic isoprene rubber. If it is less than 1 part by weight, the adhesion reaction with the plating layer will be too scarce to obtain a satisfactory initial adhesion. If over 8 parts by weight, the rubber will react excessively with the plating layer. This will lower the adhesion, especially the heat resistance, and unfavorably affect the physical properties of the rubber.

As an adhesion accelerator, a cobalt salt of organic acid, or silica, resorcin and hexamethylenetetramine may be added. As a cobalt salt of organic acid, cobalt naphtherate, cobalt stearate, cobalt oleate, and cobalt maleate may be used. The cobalt cotent should preferably be 8–10 per cent by weight in cobalt salt of organic acid. The content of the cobalt salt of organic acid should be less than 6 parts by weight. If it is more than 6 parts by weight, it will have a remarkably bad effect on the physical properties of the rubber after heat aging during use. When adding silica, resorcin and hexamethylenetetramine, the upper limits of their contents are defined because too much amount over the upper limit will decrease the wet heat resistance and have a bad effect on the physical properties of rubber.

However, preferably, such adhesion accelerators should not be added at all or limited to a small amount because not only the addition tends to lower the quality characteristics of the rubber and cause production problems but also increase the production cost of the rubber product. As to a cobalt salt of organic acid, it has heretofore been believed to be necessary to add over 0.5 part by weight to obtain a good initial adhesion. With the copper/zinc/nickel ternary alloy plating according to the present invention, the initial adhesion is improved even if a cobalt salt of organic acid exists a little or does not exist at all in the rubber. In order to further improve the initial adhesion, the rubber composition has been improved.

Namely, the rubber should contain no more than 0.5 part by weight of cobalt salt of organic acid to 100 parts by weight of natural rubber or synthetic isoprene rubber. This rubber material also contains 3 to 6 parts by weight of sulfur and 0.5 to 2 parts by weight of a vulcanization accelerator such as N-tert-buthyl-2-benzothiazolylsulfenamide or N-oxydiethylene-2-benzothiazolylsulfenamide. If the content of the vulcanization accelerator is less than 0.5 parts by weight, the vulcanizing speed will be slow, thus deteriorating the adhesion. If it is over 2 parts by weight, the modulus of the rubber will grow excessively, thus lowering the adhesion and the breaking strength of the rubber itself.

[Function]

The copper/zinc/nickel ternary alloy plating layer has such a nickel content as to gradually increase with depth from its outer surface. With this arrangement, when the plating is adhered by vulcanization to the rubber material made of natural rubber or synthetic isoprene rubber and containing or not containing a cobalt salt of organic acid, or silica, resorcin and hexamethylenetetramine, the initial adhesion will not be impaired and the adhesion after long use will be kept high. Thus, the composite material according to the present invention, which comprises metal plated with copper/zinc/nickel ternary alloy and adhered to rubber, has an excellent wet heat resistance and heat resistance while keeping a good initial adhesion.

[Example]

In the following Examples, reference numbers without dash are used for steel cords to designate Comparative Examples and Examples according to the present invention and reference numbers with dash are used for combinations of rubber and steel cords, that is, tires to designate their Comparative Examples and Examples according to the present invention.

Figure 2:
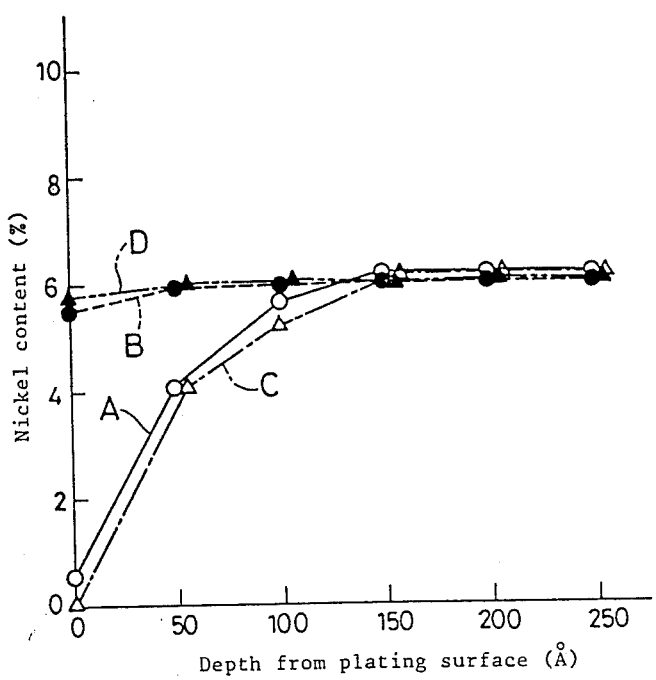
FIG. 2 is a graph showing the results of measurement of the nickel contents in various kinds of copper/zinc/nickel ternary alloy platings.

A plurality of $1 \times 5 \times 0.25$ mm dia steel cords plated with copper/zinc/nickel ternary alloys and steel cords (of the same size) plated with copper/zinc binary alloys were used. Their average compositions of plating are shown in Table 1. The nickel content distributions for Examples 3 and 10 according to the present invention and Comparison Examples 4 and 11 were measured by means of ESCA. The results are shown in FIG. 2. Table 2 shows the compositions of three rubber materials used in this example.

The steel cords and the rubber materials were adhered together by vulcanizing at 150 C. for 30 minutes and the composite materials were tested for adhesion in accordance with ASTM D2229-80. The pull-out length was 10 mm and the pull-out force was the average value of 15 pull-outs. The examples were tested for the initial adhesion and the wet heat resistance which was determined after subjecting them to wet heat aging at 80 C and 95 % RH for 10 days or at 120 C steam for one day. The results are shown in Table 3.

As shown in Table 3, the steel cords in Examples 3, 5, 6, 10, 12 and 13 according to the present invention, which are plated with copper/zinc/nickel ternary alloys, exhibited far better initial adhesion than the steel cords in Comparison Examples 4, 7, 11 and 14 which are plated with copper/zinc/nickel ternary alloys. It is apparent from Table 3 that the steel cords according to the present invention has much better wet heat resistance than the steel cords in the Comparison Examples 1 and 8 which are plated with copper/zinc binary alloys.

TABLE 1

| Kind of steel cord | Copper (wt %) | Zinc (wt %) | Nickel (wt %) |
|---|---|---|---|
| COM. EX. 1 | 65 | 35 | 0 |
| COM. EX. 2 | 65 | 33 | 2 |
| EX. 3 | 63 | 31 | 6 |
| COM. EX. 4 | 63 | 31 | 6 |
| EX. 5 | 63 | 27 | 10 |
| EX. 6 | 63 | 23 | 14 |
| COM. EX. 7 | 64 | 18 | 18 |
| COM. EX. 8 | 70 | 30 | 0 |
| COM. EX. 9 | 70 | 28 | 2 |
| EX. 10 | 71 | 23 | 6 |
| COM. EX. 11 | 70 | 24 | 6 |
| EX. 12 | 71 | 19 | 10 |
| EX. 13 | 71 | 15 | 14 |
| COM. EX. 14 | 71 | 11 | 18 |

EX. stands for Example of present invention.
COM. EX. stands for Comparative Example.

TABLE 2

| Component | Kind of rubber A | Kind of rubber B | Kind of rubber C |
|---|---|---|---|
| Natural rubber | 100 Parts by wt | 100 Parts by wt | 100 Parts by wt |
| Zinc oxide | 10 Parts by wt | 10 Parts by wt | 10 Parts by wt |
| Stearic acid | 1 Parts by wt | 1 Parts by wt | 1 Parts by wt |
| Carbon black (HAF) | 50 Parts by wt | 40 Parts by wt | 50 Parts by wt |
| Antioxidant*1 | 2 Parts by wt | 2 Parts by wt | 2 Parts by wt |
| Sulfur | 5 Parts by wt | 5 Parts by wt | 5 Parts by wt |
| Vulcanization accelerator DZ*2 | 1 Parts by wt | 1 Parts by wt | 1 Parts by wt |
| Cobalt naphthenate | 2 Parts by wt | 0 Parts by wt | 0 Parts by wt |
| Resorcin | 0 Parts by wt | 2 Parts by wt | 0 Parts by wt |
| Silica | 0 Parts by wt | 10 Parts by wt | 0 Parts by wt |
| Hexamethylene-tetramine | 0 Parts by wt | 1 Parts by wt | 0 Parts by wt |

*1 2,2,4-trimethyl-1,2-dihydroquinoline polymer
*2 DZ: N, N'-dicyclohexyl-2-benzothiazolylsulfenamide

TABLE 3

| Kind of rubber | Adhesion | COM. EX. 1 | COM. EX. 2 | EX. 3 | COM. EX. 4 | EX. 5 | EX. 6 | COM. EX. 7 | COM. EX. 8 | COM. EX. 9 | EX. 10 | COM. EX. 11 | EX. 12 | EX. 13 |
|---|---|---|---|---|---|---|---|---|---|---|---|---|---|---|
| A | Initial adhesion | 42 Kgf | 44 Kgf | 44 Kgf | 35 Kgf | 41 Kgf | 40 Kgf | 30 Kgf | 40 Kgf | 41 Kgf | 43 Kgf | 37 Kgf | 44 Kgf | 43 Kgf |
|   | Wet heat resistance (1)*3 | 20 Kgf | 20 Kgf | 25 Kgf | 24 Kgf | 25 Kgf | 24 Kgf | 23 Kgf | 15 Kgf | 16 Kgf | 29 Kgf | 27 Kgf | 28 Kgf | 27 Kgf |

TABLE 3-continued

| Kind of rubber | Adhesion | COM. EX. 1 | COM. EX. 2 | EX. 3 | COM. EX. 4 | EX. 5 | EX. 6 | COM. EX. 7 | COM. EX. 8 | COM. EX. 9 | EX. 10 | COM. EX. 11 | EX. 12 | EX. 13 |
|---|---|---|---|---|---|---|---|---|---|---|---|---|---|---|
| | Wet heat resistance (2)*4 | 13 Kgf | 14 Kgf | 24 Kgf | 25 Kgf | 27 Kgf | 27 Kgf | 22 Kgf | 20 Kgf | 20 Kgf | 31 Kgf | 32 Kgf | 30 Kgf | 31 Kgf |
| B | Initial adhesion | 41 Kgf | 41 Kgf | 38 Kgf | 31 Kgf | 32 Kgf | 31 Kgf | 22 Kgf | 39 Kgf | 39 Kgf | 41 Kgf | 33 Kgf | 43 Kgf | 42 Kgf |
| | Wet heat resistance (1) | 6 Kgf | 7 Kgf | 18 Kgf | 16 Kgf | 17 Kgf | 17 Kgf | 13 Kgf | 6 Kgf | 7 Kgf | 31 Kgf | 30 Kgf | 33 Kgf | 32 Kgf |
| | Wet heat resistance (2) | 8 Kgf | 13 Kgf | 22 Kgf | 23 Kgf | 25 Kgf | 24 Kgf | 20 Kgf | 7 Kgf | 11 Kgf | 27 Kgf | 26 Kgf | 29 Kgf | 29 Kgf |
| C | Initial adhesion | 38 Kgf | 39 Kgf | 30 Kgf | 22 Kgf | 21 Kgf | 20 Kgf | 14 Kgf | 38 Kgf | 38 Kgf | 39 Kgf | 31 Kgf | 37 Kgf | 37 Kgf |
| | Wet heat resistance (1) | 12 Kgf | 12 Kgf | 15 Kgf | 14 Kgf | 14 Kgf | 15 Kgf | 13 Kgf | 13 Kgf | 12 Kgf | 27 Kgf | 25 Kgf | 28 Kgf | 26 Kgf |
| | Wet heat resistance (2) | 22 Kgf | 23 Kgf | 35 Kgf | 34 Kgf | 33 Kgf | 33 Kgf | 30 Kgf | 24 Kgf | 26 Kgf | 31 Kgf | 32 Kgf | 30 Kgf | 31 Kgf |

*3Pull-out force after aging at 80° C., 95% RH for 10 days
*4Pull-out force after aging at 120° C. steam for 1 day

EXAMPLE 2

The rubber materials having a basic composition shown in Table 4 were adhered to 1.5 × 5 × 0.25 mm dia. steel cords having average plating compositions shown in Table 5 to test the adhesion. Test specimens were made by adhering the rubber materials and the steel cords shown in Tests 1 to 4 by vulcanizing in predetermined conditions. They were tested for peelability after subjecting them to an aging under the conditions indicated in Table 6. In these tests, the peeling force was measured by mechanically peeling the rubber material from the respective steel cords. Also, how much rubber is left on the steel cords was evaluated by eye check and marked on the basis of 10 points. Larger numbers indicate better results. In Test 5, tire examples were put to a running test to check their quality characteristics.

In Test 1, the vulcanizing conditions were examined. The test results in Test 1 are shown in Table 7. The adhesion between the rubber materials and the steel cords according to the present invention were good in terms of initial adhesion, wet heat resistance and heat resistance in spite of the fact that the rubber materials contained no cobalt salt of organic acid.

In Test 2, the relationship between the adhesion and the vulcanization accelerator in the rubber materials was evaluated. The results are shown in Table 8, which shows that the test specimens containing the vulcanization accelerator according to the present invention reveals a good adhesion.

In Test 3, the relationship between the adhesion and the contents of the cobalt stearate and sulfur in the rubber materials was evaluated. The results are shown in Table 9, which shows that the initial adhesion as well as the wet heat resistance and the heat resistance are good if the content of cobalt salt of organic acid is less than 0.5 part by weight and the sulfur content is 3–6 parts by weight.

In Test 4, the relationship between the adhesion and the contents of the nickel in the plating and the vulcanization accelerator in the rubber was evaluated. The results are shown in Table 10. When the nickel content is 4 to 14 per cent by weight and the content of the vulcanization accelerator is 0.5 to 2 parts by weight, the initial adhesion, wet heat resistance and heat resistance were good.

In Test 5, the composite materials according to the present invention and those in the Comparison Examples were made into tires and subjected to a running test to check their quality characteristics. The results are shown in Table 11, which reveals that the tires according to the present invention having a steel breaker made of the steel cords and the rubber materials containing no or less amount of cobalt salt of organic acid has extremely good quality characteristics.

TABLE 4

| Component | Part by wt |
|---|---|
| Natural rubber | 100 |
| Carbon black (HAF) | 50 |
| Zinc oxide | 8 |
| Antioxidant*5 | 2 |
| Cobalt stearate*6 | Variable |
| (Stearic acid) | (1.2) |
| Sulfur | Variable |
| Vulcanization accelerator | Variable |

*5 2,2,4-trimethyl-1,2-dihydroquinoline polymer
*6 Cobalt content 9%

TABLE 5

| Kind of steel cord | Component | | |
|---|---|---|---|
| | Copper (wt %) | Zinc (wt %) | Nickel (wt %) |
| COM. EX. 15 | 65 | 35 | 0 |
| COM. EX. 16 | 65 | 33 | 2 |
| EX. 17 | 65 | 31 | 4 |
| EX. 18 | 65 | 29 | 6 |
| COM. EX. 19 | 65 | 29 | 6 |
| EX. 20 | 65 | 27 | 8 |
| EX. 21 | 65 | 25 | 10 |
| EX. 22 | 65 | 23 | 12 |
| EX. 23 | 65 | 21 | 14 |
| COM. EX. 24 | 65 | 19 | 16 |
| COM. EX. 25 | 65 | 17 | 18 |
| COM. EX. 26 | 65 | 15 | 20 |
| COM. EX. 27 | 65 | 13 | 22 |

TABLE 6

| Aging conditions | Item | | |
|---|---|---|---|
| | Aging temperature (°C.) | Aging humidity (relative humidity) (%) | Aging time (hr) |
| (a) | — | — | 0 |
| (b) | 80 | 95 | 400 |
| (c) | 120 | 100 | 24 |

TABLE 6-continued

| Aging conditions | Aging temperature (°C.) | Aging humidity (relative humidity) (%) | Aging time (hr) |
|---|---|---|---|
| (d) | 120 | — | 96 |

(Test 1) Evaluation of Vulcanizing Conditions

| Rubber composition | Part by wt | Steel cord | Vulcanizing conditions |
|---|---|---|---|
| Natural rubber | 100 | EX. 18 | 170° C.-10 min. |
| Carbon black (HAF) | 50 | COM. EX. 19 | 150° C.-30 min. |
| Zinc oxide | 8 | | |
| Antioxidant | 2 | | |
| Cobalt stearate | 0 | | |
| Stearic acid | 1.2 | | |
| Sulfur | 5 | | |
| Vulcanization accelerator NS*7 | 1 | | |

*7NS: N-tert-buthyl-2-benzothiazolylsulfenamide

TABLE 7

| Vulcanizing conditions | Aging conditions | Kind of steel cord | |
|---|---|---|---|
| | | EX. 18 | COM. EX. 19C.-10 |
| 170° C. min. | (a) | 10 points | 10 points |
| | (b) | 10 points | 10 points |
| | (c) | 10 points | 9 points |
| | (d) | 10 points | 10 points |
| 150° C.-30 min. | (a) | 9 points | 6 points |
| | (b) | 9 points | 7 points |
| | (c) | 10 points | 7 points |
| | (d) | 10 points | 7 points |

(Test 2) Evaluation of Vulcanization Accelerator in Rubber

| Rubber composition | Part by wt | Steel cord | Vulcanizing condition |
|---|---|---|---|
| Natural rubber | 100 | EX. 18 | 150° C.-30 min. |
| Carbon black (HAF) | 50 | | |
| Zinc oxide | 8 | | |
| Antioxidant | 2 | | |
| Cobalt stearate | 0 | | |
| Stearic acid | 1.2 | | |
| Sulfur | 5 | | |
| Vulcanization accelerator (Kind changed) | 1 | | |

TABLE 8

| Aging conditions | Kind of vulcanization accelerator | | | |
|---|---|---|---|---|
| | COM. EX. DZ | EX. MOR*8 | EX. NS | COM. EX. CZ*9 |
| (a) | 6 points | 10 points | 9 points | 7 points |
| (b) | 6 points | 9 points | 9 points | 8 points |
| (c) | 8 points | 9 points | 10 points | 8 points |
| (d) | 7 points | 10 points | 10 points | 7 points |

*8MOR: N-oxidiethylene-2-benzothiazolylsulfenamide
*9CZ: N-cyclohexyl-2-benzothiazolylsulfenamide (Test 3) Evaluation of Contents of Cobalt Stearate and Sulfur in Rubber

| Rubber composition | Part by wt | Steel cord | Vulcanizing condition |
|---|---|---|---|
| Natural rubber | 100 | EX. 18 | 150° C.-30 min. |
| Carbon black (HAF) | 50 | | |
| Zinc oxide | 8 | | |
| Antioxidant | 2 | | |
| Cobalt stearate (Stearic acid | Variable Variable) | | |
| Sulfur | Variable | | |
| Vulcanization accelerator NS or MOR | 1 | | |

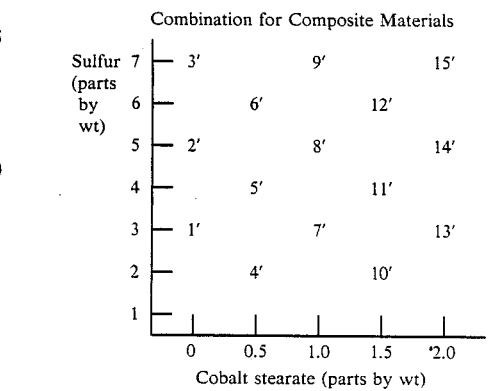

Combination for Composite Materials

TABLE 9

Figures not in bracket denote points on max of 10.
Figures in bracket denote peeling force in Kgf/cm of peeling width.

| (*12) | (*11) | EX. 1' | EX. 2' | COM. EX. 3' | COM. EX. 4' | EX. 5' | EX. 6' | COM. EX. 7' | COM. EX. 8' | COM. EX. 9' | COM. EX. 10' | COM. EX. 11' | COM. EX. 12' | COM. EX. 13' | COM. EX. 14' | COM. EX. 15' |
|---|---|---|---|---|---|---|---|---|---|---|---|---|---|---|---|---|
| NS | (a) | 8 | 9 | 9 | 3 | 10 | 10 | 8 | 10 | 10 | 4 | 10 | 10 | 8 | 10 | 10 |
| | | (6.3) | (6.4) | (6.5) | (3.5) | (6.5) | (6.5) | (5.8) | (6.4) | (6.5) | (4.0) | (5.8) | (6.2) | (5.8) | (6.0) | (6.0) |
| | (b) | 9 | 9 | 9 | 6 | 10 | 10 | 9 | 10 | 10 | 6 | 8 | 9 | 9 | 9 | 9 |
| | | (5.3) | (5.5) | (4.8) | (4.6) | (5.2) | (5.2) | (4.7) | (4.8) | (4.7) | (4.5) | (4.6) | (4.6) | (4.3) | (4.5) | (4.5) |
| | (c) | 10 | 10 | 8 | 6 | 10 | 10 | 6 | 6 | 6 | 3 | 4 | 4 | 2 | 3 | 3 |
| | | (5.0) | (5.2) | (3.8) | (4.0) | (5.0) | (5.0) | (3.9) | (4.2) | (4.4) | (3.8) | (3.7) | (3.8) | (2.1) | (2.2) | (2.1) |
| | (d) | 9 | 10 | 8 | 6 | 10 | 10 | 9 | 9 | 8 | 6 | 7 | 7 | 6 | 6 | 6 |
| | | (4.6) | (4.6) | (3.2) | (3.0) | (4.2) | (4.0) | (3.5) | (3.5) | (3.3) | (2.7) | (3.0) | (3.0) | (2.1) | (2.0) | (2.1) |
| MOR | (a) | 8 | 10 | 9 | 4 | 10 | 10 | 8 | 9 | 10 | 5 | 9 | 9 | 9 | 9 | 9 |
| | | (6.0) | (6.4) | (6.4) | (4.0) | (6.5) | (6.6) | (5.8) | (6.3) | (6.5) | (4.3) | (6.3) | (6.3) | (6.2) | (6.1) | (6.0) |
| | (b) | 9 | 9 | 9 | 8 | 6 | 10 | 10 | 10 | 9 | 5 | 9 | 9 | 9 | 9 | 9 |
| | | (5.4) | (5.4) | (4.8) | (4.6) | (5.3) | (5.4) | (5.2) | (5.2) | (5.0) | (4.2) | (4.8) | (4.7) | (4.6) | (4.5) | (4.5) |
| | (c) | 9 | 9 | 8 | 5 | 10 | 10 | 6 | 5 | 5 | 4 | 4 | 4 | 3 | 3 | 2 |
| | | (5.1) | (5.1) | (4.8) | (3.8) | (4.9) | (5.2) | (4.0) | (4.0) | (3.8) | (3.7) | (3.6) | (3.7) | (2.4) | (2.2) | (2.0) |

TABLE 9-continued

Figures not in bracket denote points on max of 10.
Figures in bracket denote peeling force in Kgf/cm of peeling width.

| (*12) | (*11) | EX. 1' | EX. 2' | COM. EX. 3' | COM. EX. 4' | EX. 5' | EX. 6' | COM. EX. 7' (*10) | COM. EX. 8' | COM. EX. 9' | COM. EX. 10' | COM. EX. 11' | COM. EX. 12' | COM. EX. 13' | COM. EX. 14' | COM. EX. 15' |
|---|---|---|---|---|---|---|---|---|---|---|---|---|---|---|---|---|
| | (d) | 9 (4.3) | 10 (4.5) | 7 (3.8) | 5 (2.5) | 9 (4.3) | 9 (4.3) | 9 (4.2) | 8 (4.0) | 7 (3.5) | 6 (2.5) | 7 (3.1) | 6 (2.9) | 5 (2.0) | 6 (2.0) | 5 (2.0) |

(*10) Combination of rubber and steel cord
(*11) Aging conditions
(*12) Vulcanization accelerator (Test 4) Evaluation of Content of Nickel in Plating and Content of Vulcanization Accelerator in Rubber

| Rubber composition | Part by wt | Steel cord | Vulcanizing condition |
|---|---|---|---|
| Natural rubber | 100 | EX. 17, 18, 20~23 | 150° C.-30 min. |
| Carbon black (HAF) | 50 | COM. EX. 15, 16, 24~27 | |
| Zinc oxide | 8 | | |
| Antioxidant | 2 | | |
| Cobalt stearate | 0 | | |
| Stearic acid | 1.2 | | |
| Sulfur | 5 | | |
| Vulcanization accelerator NS or MOR | Variable | | |

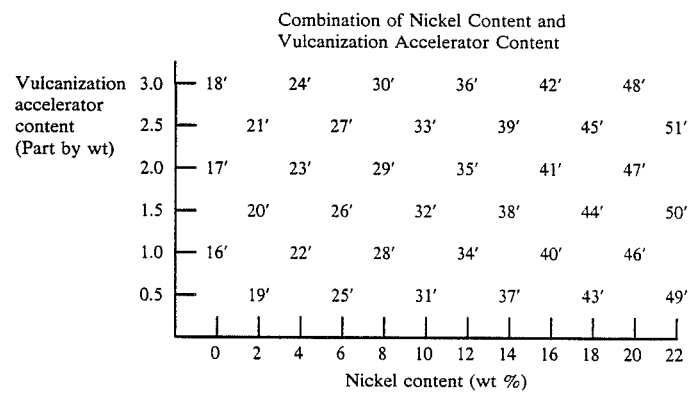

Combination of Nickel Content and Vulcanization Accelerator Content

TABLE 10

Figures not in bracket denote points on max of 10.
Figures in bracket denote peeling force in Kfg/cm of peeling width.

| (*12) | (*11) | COM. EX. 16' | COM. EX. 17' | COM. EX. 18' | COM. EX. 19' | COM. EX. 20' | COM. EX. 21' (*10) | EX. 22' | EX. 23' | COM. EX. 24' | EX. 25' | EX. 26' | COM. EX. 27' | EX. 28' |
|---|---|---|---|---|---|---|---|---|---|---|---|---|---|---|
| NS | (a) | 9 (6.0) | 9 (6.2) | 9 (6.3) | 9 (5.9) | 9 (6.2) | 9 (6.0) | 10 (6.3) | 10 (5.8) | 8 (6.0) | 9 (6.0) | 10 (6.5) | 9 (5.9) | 9 (6.4) |
| | (b) | 6 (4.4) | 6 (4.4) | 5 (4.0) | 7 (4.8) | 8 (4.7) | 8 (5.0) | 10 (5.5) | 9 (5.5) | 7 (5.0) | 9 (5.3) | 10 (5.3) | 8 (4.9) | 9 (5.5) |
| | (c) | 4 (3.2) | 3 (3.1) | 3 (2.9) | 5 (4.3) | 6 (4.0) | 7 (4.8) | 10 (5.3) | 9 (5.4) | 6 (4.7) | 10 (4.9) | 9 (4.9) | 7 (4.0) | 10 (5.2) |
| | (d) | 8 (3.7) | 9 (3.6) | 8 (3.4) | 9 (4.7) | 9 (4.3) | 8 (3.5) | 9 (4.5) | 9 (4.3) | 8 (3.6) | 9 (4.5) | 9 (4.5) | 8 (4.0) | 10 (4.6) |
| MOR | (a) | 9 (6.2) | 9 (6.1) | 9 (6.0) | 9 (6.1) | 8 (6.0) | 9 (6.0) | 10 (6.3) | 10 (6.1) | 8 (5.9) | 9 (6.0) | 10 (6.4) | 9 (6.1) | 9 (6.3) |
| | (b) | 6 (4.4) | 6 (4.5) | 6 (4.6) | 7 (4.9) | 8 (5.0) | 8 (5.1) | 10 (5.4) | 9 (5.3) | 7 (4.9) | 9 (5.3) | 9 (5.2) | 9 (5.3) | 10 (5.4) |
| | (c) | 4 (3.5) | 4 (3.8) | 4 (4.0) | 6 (4.5) | 7 (4.6) | 7 (4.7) | 10 (5.4) | 10 (5.4) | 7 (4.7) | 10 (5.3) | 9 (4.9) | 7 (4.6) | 10 (5.3) |
| | (d) | 7 (3.4) | 8 (3.6) | 7 (3.5) | 8 (3.7) | 8 (3.8) | 9 (4.4) | 10 (4.6) | 9 (4.3) | 8 (4.0) | 9 (4.5) | 10 (4.6) | 8 (4.3) | 10 (4.6) |

| (*12) | (*11) | EX. 29' | COM. EX. 30' | EX. 31' | EX. 32' | COM. EX. 33' | EX. 34' (*10) | EX. 35' | COM. EX. 36' | EX. 37' | EX. 38' | COM. EX. 39' | COM. EX. 40' | COM. EX. 41' |
|---|---|---|---|---|---|---|---|---|---|---|---|---|---|---|
| NS | (a) | 10 (6.2) | 8 (5.7) | 8 (5.7) | 9 (5.8) | 9 (5.9) | 9 (6.0) | 9 (5.5) | 8 (5.5) | 8 (5.6) | 9 (5.8) | 8 (5.5) | 8 (5.6) | 7 (4.9) |
| | (b) | 9 | 8 | 9 | 10 | 7 | 10 | 9 | 9 | 9 | 9 | 8 | 8 | 8 |

TABLE 10-continued

Figures not in bracket denote points on max of 10.
Figures in bracket denote peeling force in Kfg/cm of peeling width.

|     |     | | | | | | | | | | | | |
|---|---|---|---|---|---|---|---|---|---|---|---|---|
|     | (c) | (4.9) 9 | (4.7) 7 | (4.8) 10 | (5.0) 10 | (4.6) 8 | (5.0) 9 | (5.0) 9 | (5.1) 7 | (4.9) 9 | (4.7) 9 | (4.8) 9 | (4.6) 7 | (4.6) 7 |
|     | (d) | (4.8) 9 | (4.2) 7 | (4.9) 10 | (5.0) 10 | (4.4) 8 | (4.9) 9 | (4.9) 10 | (4.0) 8 | (4.9) 9 | (4.8) 8 | (4.7) 7 | (4.2) 6 | (4.0) 7 |
| MOR | (a) | (4.3) 10 | (3.7) 8 | (4.5) 8 | (4.5) 9 | (4.1) 9 | (4.5) 9 | (4.5) 9 | (3.9) 8 | (4.3) 9 | (4.0) 9 | (3.6) 8 | (3.6) 7 | (3.6) 7 |
|     | (b) | (6.2) 10 | (5.8) 7 | (5.8) 9 | (6.0) 9 | (5.9) 7 | (6.1) 9 | (5.7) 9 | (5.6) 8 | (5.7) 9 | (5.7) 9 | (5.5) 8 | (4.9) 7 | (5.0) 7 |
|     | (c) | (5.2) 9 | (4.9) 8 | (5.2) 9 | (5.3) 10 | (4.8) 7 | (5.0) 9 | (5.0) 9 | (4.8) 8 | (5.0) 8 | (4.9) 9 | (4.9) 9 | (4.6) 8 | (4.5) 8 |
|     | (d) | (5.0) 10 | (4.8) 8 | (5.0) 10 | (5.2) 10 | (4.5) 9 | (4.9) 9 | (4.8) 9 | (4.6) 8 | (4.7) 9 | (4.8) 9 | (4.9) 7 | (4.7) 7 | (4.8) 7 |
|     |     | (4.5) | (4.0) | (4.7) | (4.6) | (4.4) | (4.6) | (4.6) | (4.4) | (4.5) | (4.5) | (4.3) | (3.9) | (4.0) |

| (*12) | (*11) | COM. EX. 42' | COM. EX. 43' | COM. EX. 44' | COM. EX. 45' | (*10) COM. EX. 46' | COM. EX. 47' | COM. EX. 48' | COM. EX. 49' | COM. EX. 50' | COM. EX. 51' |
|---|---|---|---|---|---|---|---|---|---|---|---|
| NS | (a) | 7 | 6 | 6 | 5 | 4 | 4 | 4 | 4 | 3 | 3 |
|    |     | (5.0) | (4.7) | (4.8) | (3.9) | (3.8) | (3.8) | (3.8) | (3.6) | (3.3) | (3.2) |
|    | (b) | 6 | 7 | 7 | 6 | 5 | 4 | 5 | 4 | 4 | 4 |
|    |     | (4.3) | (4.5) | (4.5) | (4.3) | (4.0) | (3.8) | (4.9) | (3.6) | (3.6) | (3.3) |
|    | (c) | 6 | 7 | 8 | 7 | 6 | 4 | 5 | 4 | 4 | 4 |
|    |     | (3.8) | (4.2) | (4.6) | (4.2) | (3.5) | (3.0) | (3.5) | (2.9) | (2.9) | (2.8) |
|    | (d) | 6 | 6 | 6 | 6 | 4 | 4 | 4 | 4 | 3 | 3 |
|    |     | (3.3) | (3.3) | (3.3) | (3.0) | (2.9) | (2.9) | (2.8) | (2.9) | (2.8) | (2.7) |
| MOR | (a) | 6 | 7 | 7 | 6 | 5 | 4 | 4 | 3 | 3 | 3 |
|    |     | (4.6) | (4.9) | (4.7) | (4.6) | (4.2) | (4.0) | (3.9) | (3.6) | (3.5) | (3.4) |
|    | (b) | 8 | 7 | 7 | 6 | 4 | 4 | 5 | 4 | 3 | 4 |
|    |     | (4.8) | (4.5) | (4.6) | (4.5) | (4.2) | (3.9) | (4.5) | (3.9) | (3.6) | (3.9) |
|    | (c) | 8 | 8 | 7 | 6 | 5 | 5 | 4 | 4 | 4 | 4 |
|    |     | (4.6) | (4.7) | (4.5) | (4.2) | (3.7) | (3.6) | (3.2) | (3.1) | (2.9) | (2.8) |
|    | (d) | 6 | 7 | 6 | 5 | 5 | 5 | 3 | 3 | 3 | 2 |
|    |     | (3.5) | (3.8) | (3.5) | (3.0) | (3.3) | (2.9) | (2.8) | (2.8) | (2.9) | (2.5) |

(*10) Combination of rubber and steel cord
(*11) Aging conditions
(*12) Vulcanization accelerator

| (Test 5) Evaluation of Tires | | | | | |
|---|---|---|---|---|---|
| Rubber composition | EX. | COM. EX. | EX. | EX. | COM. EX. |
| Natural rubber | 100 | 100 | 100 | 100 | 100 |
| Carbon black (HAF) | 50 | 50 | 50 | 50 | 50 |
| Zinc oxide | 8 | 8 | 8 | 8 | 8 |
| Antioxidant | 2 | 2 | 2 | 2 | 2 |
| Cobalt stearate | 0 | 0 | 0 | 0.5 | 2 |
| Stearic acid | 1.2 | 1.2 | 1.2 | 0.9 | 0 |
| Sulfur | 5 | 5 | 5 | 5 | 5 |
| Vulcanization accelerator | 1 (NS) | 1 (DZ) | 1 (NS) | 1 (NS) | 1 (DZ) |
| Steel cord | EX. 18 | EX. 18 | COM. EX. 19 | EX. 18 | EX. 18 |
|  | ↓ | ↓ | ↓ | ↓ | ↓ |
| Tire*13 (Combination of rubber and steel cord) | EX. 52' | COM. EX. 53' | COM. EX. 54' | EX. 55' | COM. EX. 56' |

*13 Tire test component: Breaker, Tire size: 165SR13

TABLE 11

| Tire test | | Kind of Tire | | | | |
|---|---|---|---|---|---|---|
|  |  | EX. 52' | COM. EX. 53' | COM. EX. 54' | EX. 55' | COM. EX. 56' |
| Test on machine | Continuous high-speed test | No damage after 30,000 km run | Breaker edge got loose after 15,000 km run | Breaker edge got loose and tread separated after 5,000 km run | No damage after 30,000 km run | No damage after 30,000 km run |
|  | Wet heat continuous high-speed test | No damage after 30,000 km run | Tread separated after 10,000 km run | Tread separated after 30,000 km run | No damage after 30,000 km run | Breaker edge got loose after 30,000 km run |
| Test on vehicle | Running test | No damage after 35,000 km run | — | — | No damage after 35,000 km run | No damage after 35,000 km run |
|  | Pull-out force (in kgf/cm) between breakers | 5.2 | — | — | 5.0 | 4.0 |

TABLE 11-continued

| Tire test | Kind of Tire | | | | |
|---|---|---|---|---|---|
| | EX. 52' | COM. EX. 53' | COM. EX. 54' | EX. 55' | COM. EX. 56' |
| after 35,000 km run | | | | | |

The composite material according to the present invention is made of a metal plated with a copper-zinc-nickel ternary alloy and a rubber. It reveals excellent wet heat resistance and heat resistance while retaining good initial adhesion properties. Further, it is free of such problems as environmental pollution or burning of rubber which are incident to the production of rubber articles.

INDUSTRIAL APPLICATION

The composite material according to the present invention can be used for a wide range of rubber products such as automotive tires, high-pressure hoses and conveyor belts and especially useful for the application where excellent adhesion between the metal and rubber is required.

We claim:

1. A metal plated with a copper/zinc/nickel ternary alloy plating comprising 60 to 75 per cent by weight of copper, 4 to 14 per cent by weight of nickel and the remainder of zinc, and the content of nickel being not more than 4 per cent by weight at the outer surface of the plating, increasing gradually with depth from the outer surface to the depth of 50 angstroms, and being about 4 to 14 per cent by weight in the deeper area.

2. A composite material produced by vulcanzing to adhere to the metal as claimed in claim 1 a rubber comprising 100 parts by weight of natural rubber or synthetic isoprene rubber, 1 to 8 parts by weight of sulfur, and either not more than 5 parts by weight of resorcin and not more than 5 parts by weight of hexamethylenetetramine as an adhesion accelerator.

3. A composite material produced by vulcanizing to adhere to the metal as claimed in claim 1 a rubber comprising 100 parts by weight of natural rubber or synthetic isoprene rubber, 3 to 6 parts by weight of sulfur, not more than 0.5 part by weight of a cobalt salt of an organic acid as an adhesion accelerator, and 0.5 to 2 parts by weight of N-tert-buthyl-2-benzothiazolylsulfenamide or N-oxydiethylene-2-benzothiazolylsulfenamide as a vulcanization accelerator.

* * * * *